2,945,887
PREPARATION OF BORON ALKYLS

Herbert Jenkner, Hannover-Wulfel, Germany, assignor to Kali-Chemie Aktiengesellschaft, Hannover, Germany No Drawing. Filed Mar. 11, 1958, Ser. No. 720,565

Claims priority, application Germany Mar. 13, 1957

5 Claims. (Cl. 260—606.5)

The invention relates to the preparation of alkyl or alicyclic substituted borines.

In my copending application, Serial No. 719,996 for Preparation of Amine-Borines, filed March 10, 1958, I have disclosed and claimed a process for the preparation of borazans, which consists in heating a boron-halogen compound with an alkali metal hydride and an amine at a temperature of about 50 to 120° C. in the presence of an efficient amount of an activator selected from the group consisting of trialkyl borines and esters of boric acid, boronic acid and borinic acid with a lower aliphatic alcohol.

Said borazans react with hydrocarbons having an ethylenic double bond, such as alkenes and cycloalkenes, to form alkyl and cycloalkyl substituted borines, whereby the amine is split off when all the hydrogen atoms of the borine have been substituted. I have found that it is not necessary for the alkylation reaction to perpare and separate the borazan; the borazan formed in the reaction (1) 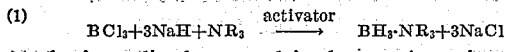
$$BCl_3 + 3NaH + NR_3 \xrightarrow{\text{activator}} BH_3 \cdot NR_3 + 3NaCl$$

can be immediately reacted in the reaction mixture with an alkene according to the reaction (2) 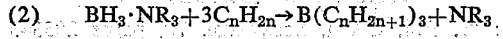
$$BH_3 \cdot NR_3 + 3C_nH_{2n} \rightarrow B(C_nH_{2n+1})_3 + NR_3$$

It is not even necessary to carry out the Reactions 1 and 2 successively; they may be consolidated to a single step procedure, which is illustrated by the overall equation (3) 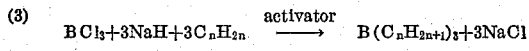
$$BCl_3 + 3NaH + 3C_nH_{2n} \xrightarrow{\text{activator}} B(C_nH_{2n+1})_3 + 3NaCl$$

A comparison between Equation 3, and Equations 1 and 2 which illustrate the intermediate reactions, shows that the amine, like the activator, is not consumed in the reaction and serves only to stabilize the borine. Both, amine and activator, can therefore be recovered and used again or recycled.

The entire reaction may be carried out in the temperature range suitable for the formation of borazan, that is: at about 50 to 120° C., or the second step according to Reaction 2 may be carried out at elevated temperatures of about 50° C. to 220° C., whereby also slightly elevated pressures of about 2 to 50 atm. may be applied.

Suitable boron halides are halides containing at least one halogen atom bound to boron. Such halides are, for instance, boron trichloride, diboron tetrachloride, and also organo-substituted boron halides, such as monoalkyl and monoalkoxy boron dichlorides and dialkyl and dialkoxy boron monochlorides.

The preferred alkali metal hydride is sodium hydride, because it is the cheapest and most readily available alkali metal hydride and reacts very quickly. Potassium hydride reacts in similar manner.

Any straight, branched or substituted hydrocarbon having an ethylenic double bond may be used; the selection will depend on the alkyl or cyloalkyl group which is to be substituted for the hydrogen of the borine.

As indicated in Equation 1, the reaction requires an activator in order to activate the unsoluble alkali metal hydride. Suitable activators are metal organic compounds, particularly alkyls, alkyl hydrides, and alkoxides of metals of the third group of the periodic system, such as boron, aluminum, gallium. Already .1 percent by weight of such compounds, calculated on the alkali metal hydride, are effective; generally, 5 to 30 percent will be used. If organic compounds other than organo-boron compounds are used, such compounds will react with the boron halide to form organoboron compounds, so that eventually also in that case the effective activator will be the organo-boron compound.

The presence of the amine is necessary to convert the borine formed in the hydrogenation of the boron halide into a stable complex compound. Particularly suitable are tertiary amines, such as trimethylamine, triethylamine, tripropylamine, diethylpropylamine, but also dibutylamine, morpholine, piperidine, and N-alkyl substitution products thereof. As set forth in my copending application, Serial No. 719,996, neither the nature nor the amount of the amine is critical but I found it advantageous to apply an excess of about 5 to 20 percent by weight over the stoichiometrically required amount.

By using an amount of alkene not sufficient for the total alkylation of the borine, partially alkylated amine-borines are obtained. In most cases, it is possible to separate the partially alkylated compound from the amine by distillation.

The reaction is preferably carried out in an indifferent solvent or suspending organic liquid, such as a mineral oil, which is stable and not volatile at the reaction temperatures. Also, the alkenes or borazans themselves may be used as liquid reaction medium.

It is further of advantage to remove the alkali metal halide, formed in the first step of the reaction, before the alkene is introduced.

The obtained alkyl and cyloalkyl borines are useful as catalysts in organic reactions, as fuels or fuel additives, as insecticides and in the pharmaceutical industry.

The following examples, in which parts are given by weight unless otherwise specified, are given to illustrate but not to limit the invention.

Example 1

A suspension of 50 parts of sodium hydride in 200 parts of a mineral oil (B.$_1$ 200–220° C.) was heated at 70° C., and 15 parts of triethyl borine were added. Then, 68 parts of triethylamine were added, and 79 parts of boron trichloride were slowly introduced in the mixture with vigorous stirring.

Subsequently, the temperature of the mixture was raised to 150 to 170° C., and ethylene was passed into the batch. The take-up of ethylene was 48 parts, corresponding to more than 90 percent of the theoretical amount.

If the N-triethyl borazan formed in the first step was distilled off in vacuo and then reacted with ethylene at 140–170° C., the yield of triethyl borine was still somewhat better. The yield could also be increased when in the two-step procedure the temperature in the second step was raised to 200° C. and the reaction was carried out under pressure.

Example 2

To 25 parts of sodium hydride, suspended in 180 parts of octane, there were added, at a temperature of 80° C., first 15 parts of triethyl borine and then 35 parts of triethylamine, whereupon at a temperature of 80 to 95° C., 40 parts of boron trichloride were slowly introduced. After removal of the precipitated NaCl by centrifuging, 90 parts of cyclohexene were added, and the mixture was refluxed for two hours. The reaction mixture was then subjected to distillation to remove triethyl borine, triethylamine, and octane, and there remained 65 parts of tricyclohexyl borine (more than 76 percent of the theoretic amount).

*Example 3*

18 parts of triethyl borine and 35 parts of triethylamine were added at 75° C. to a suspension of 25 parts of sodium hydride in 18 parts of cyclohexene. Then 39.5 parts of boron trichloride were introduced at a temperature of 75 to 85° C. After cooling, the reaction mixture was centrifuged to remove the sodium chloride, and the volatile constituents were distilled off at atmospheric pressure. 40 parts of tricyclohexyl borine were obtained.

*Example 4*

A suspension of 50 parts of sodium hydride in 200 parts of a mineral oil (B.₁ 200–220° C.) were heated at 80 to 100° C., and 15 parts of methyl borate were added. Subsequently, 96 parts of tripropylamine were added, and 79 parts of boron trichloride were passed into the mixture with vigorous stirring.

The ethylene addition was carried out as set forth in Example 1.

There were obtained 47.5 parts of triethyl borine, corresponding to a yield of more than 90 percent.

I claim:

1. The process of preparing organosubstituted borines of the formula $$BR_3$$

wherein R is a member of the group consisting of alkyl and cycloalkyl radicals, comprising heating a boron-halogen compound selected from the group consisting of boron trichloride, diboron tetrachloride, alkyl boron chlorides, alkoxy boron chlorides, with an alkali metal hydride and a member of the group consisting of alkenes and cycloalkenes at a temperature of about 50 to 220° C. in the presence of an amine selected from the group consisting of lower secondary and tertiary alkylamines, piperidine, morpholine, and the N-alkyl derivatives of said piperidine and morpholine and an organo-metal compound activating said alkali metal hydride, said compound being selected from the group consisting of lower alkyls, lower alkyl hydrides, and lower alkoxides of boron, aluminum, and gallium, and separating the obtained $BR_3$ compound.

2. The process as defined in claim 1, wherein said amine has the formula $$NR_xR'_{3-x}$$

wherein R is a member of the group consisting of alkyl having 1 to 5 carbon atoms and hydrogen, R' is alkyl having 1 to 5 carbon atoms, and x is an integer from 1 to 2.

3. The process of preparing organosubstituted borines of the formula $$BR_xH_{3-x}$$

wherein R is a member of the group consisting of alkyl and cycloalkyl radicals and x is an integer from 2 to 3, comprising heating a boron-halogen compound selected from the group consisting of boron trichloride, diboron tetrachloride, alkyl boron chlorides, alkoxy boron chlorides at the temperature of about 50 to 120° C. with sodium hydride in the presence of an amine selected from the group consisting of lower secondary and tertiary alkylamines, piperidine, morpholine, and the N-alkyl derivatives of said piperidine and morpholine and an alkyl borine, thereby obtaining an amine borine and sodium chloride, heating said amine-borine at a temperature of about 50 to 220° C. with a member of the group consisting of alkenes and cycloalkenes, and recovering the obtained $BR_xH_{3-x}$ compound.

4. The process as defined in claim 3, including the step of removing the precipitated sodium chloride before the reaction with said alkene and cyloalkene.

5. The process as defined in claim 3, wherein the reaction with said alkene and cyloalkene is carried out at a pressure of about 2 to 50 atm.

References Cited in the file of this patent

UNITED STATES PATENTS 2,544,472    Schlesinger _____ Mar. 6, 1951

OTHER REFERENCES

Hurd: "J. Am. Chem. Soc.," vol. 70, pages 2053–5 (1948).